Inventor:
Harry C. Wendt
by. Richard E. Hosley
His Attorney

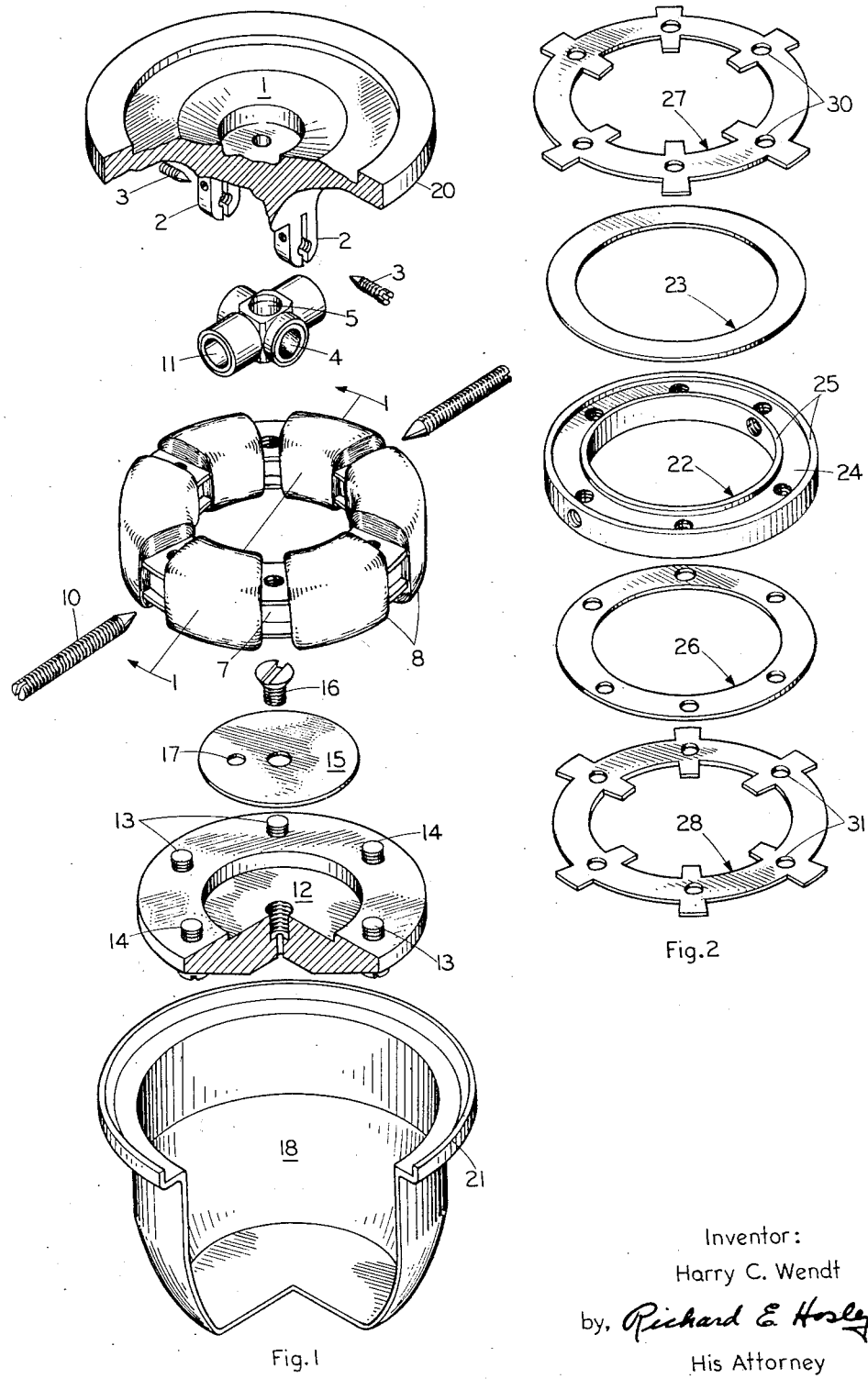

May 28, 1957   H. C. WENDT   2,794,181
ELECTROMAGNETIC TELEMETERING DEVICE
Filed Dec. 20, 1955   3 Sheets-Sheet 3

Inventor:
Harry C. Wendt
by, Richard E. Hosley
His Attorney

United States Patent Office
2,794,181
Patented May 28, 1957

2,794,181

ELECTROMAGNETIC TELEMETERING DEVICE

Harry C. Wendt, Lynnfield Center, Mass., assignor to General Electric Company, a corporation of New York Application December 20, 1955, Serial No. 554,284

6 Claims. (Cl. 340—197)

This invention relates to improved electromagnetic devices and, more particularly, to improved telemetering units, such as magnetic field detectors, employing the saturable characteristics of a material having a high magnetic permeability.

Magnetic field detectors utilizing the saturable characteristics of a high permeability material to create a double frequency alternating signal from an external magnetic field are known in the art. Such detectors may include one or more circular laminations of a material having a high magnetic permeability and low coercive force. Toroidally wound about the laminations are positioned a primary excitation winding and a secondary polyphase winding, usually connected in a three-phase selsyn manner. The operation of such a detector is as follows: the detector arrangement is suspended within the magnetic field to be measured, usually the earth's field, and the primary winding is excited with alternating current to a level sufficient to saturate the laminations periodically. This has the effect of reducing the permeability of the laminations twice during each cycle of the excitation current thereby alternately directing a portion of the external magnetic field into and out of the laminations twice during each cycle. As a result, there is induced in the secondary winding a pattern of polyphase signals twice the frequency of the applied excitation current, the phases and amplitudes of which are characteristic of the direction and strength of the external magnetic fieled.

In addition to the polyphase signal, there is also induced in the secondary winding a fundamental frequency signal by the circumferential excitation flux. This flux-induced fundamental frequency signal may be eliminated to a large extent by dividing the secondary winding in a three-phase system, for example, into six subsections, diametrically opposite pairs of subsections being connected in series opposition to form a single-phase section. Thus, any changing circumferential flux in the laminations will produce a net current of zero in each phase section of the secondary winding, but second harmonic signals resulting from an external magnetic field will be additively combined in each phase section. The output signal may then be applied to a suitable detector arrangement and used to position a compass card, to slave a gyro, or to perform other related functions.

Unfortunately, the virtual elimination of the flux-induced fundamental frequency signal from the polyphase winding of a telemetering unit, such as the magnetic field detector just described, does not result in the elimination of all excess or spurious signals. In addition to the second harmonic signal, there will be present in the polyphase winding a background of unwanted "noise" signals arising from various causes, such as the capacitive interchange of signals between the primary and secondary windings and magnetic dissymmetries in the lamination structure. Whereas the presence of spurious signals in many magnetic inductor applications may not be troublesome, in electromagnetic telemetering devices, the magnitude of the desired signal is frequently so small that even the presence of low level noise signals in the windings may be a significant factor in reducing the utility and precision of the telemetering system.

Accordingly, an object of this invention is to provide a telemetering unit having an inherently high signal-to-noise ratio in its polyphase winding.

Another object of this invention is to provide a telemetering unit with a minimal capacitive interchange of signals between its excitation and polyphase windings.

By way of a brief summary of one aspect of the invention, there is provided in a toroid-type magnetic field detector a core structure such as that described and claimed in my copending application entitled, "Electromagnetic Telemetering Device and Method of Manufacture," Serial No. 554,285 filed of even date herewith, comprising a pair of ring-shaped laminations of a material having a high degree of magnetic permeability and a low coercive force. There is also provided a channeled annular supporting core formed of a non-magnetic material having a temperature coefficient of expansion comparable to that of the lamination material. Each of the laminations is supported within a separate channel of the core and protected by surrounding flanges. The flanges fit the laminations closely, but not so closely as to prevent the laminations from being turned in their channels. A cover of non-metallic material is placed over each channel. Projections on the cover provide convenient means for spacing the winding segments, and apertures in the cover at various locations permit access to the laminations for adjustment purposes.

The primary winding is formed of a series of segments positioned equally about the toroid structure. Connections between the primary segments are such as to result in all segments being series connected to produce a circumferential flux in the laminations and so that the outermost layers of diametrically opposite pairs of segments are connected directly together. The secondary winding consists of a series of segments wound directly upon the primary winding segments. Diametrically opposite pairs of secondary segments are connected in series opposition with their innermost layers connected directly together. While this winding scheme does not necessarily decrease the capacitance between primary and secondary windings, it does result in balancing capacitively transferred signals on one side of the telemetering unit against those similarly transferred signals on the other side of the unit.

While the scope of this invention is not to be limited, except by a fair interpretation of the appended claims, the details of the invention, as well as further objects and advantages may best be understood in connection with the drawings wherein:

Figure 1 represents an exploded pictorial view of an improved magnetic field transmitter constructed in accordance with this invention;

Figure 2 represents an exploded pictorial view of a lamination structure useful in conjunction with this invention;

Figure 6:
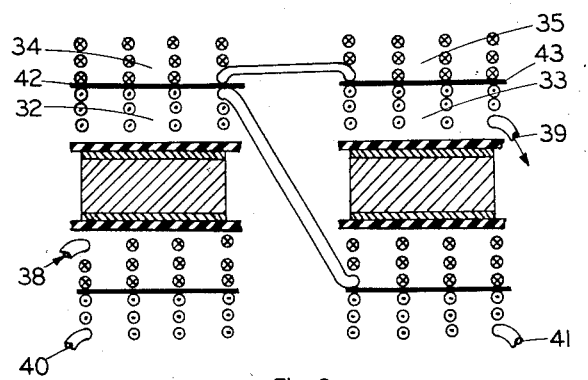
Figure 5:
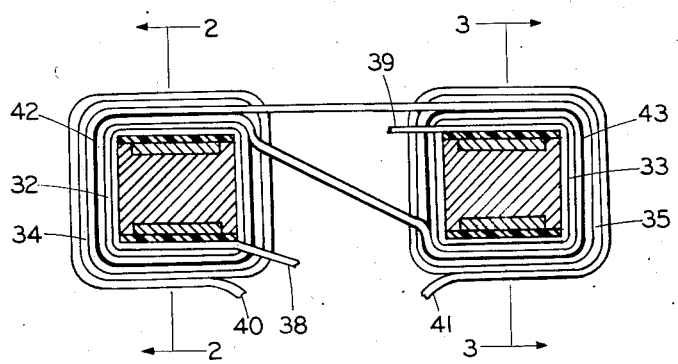

Figure 5 is a diagrammatic representation of a cross sectional view taken on line 1—1 of Figure 1 and showing the electrical connections between coil segments; and, Figure 6 is a composite cross sectional view taken on lines 2—2 and 3—3 of Figure 5 and showing the electrical connections between coil segments.

Referring now to Figure 1 of the drawings, there is provided a suspension frame 1 having dependent legs 2 in which are inserted pivot pins 3. Bearings 4 support gimbal 5 for rotation about the axis of pivot pins 3.

Transmitter assembly 6, including core structure 7 and segmented toroidal coils 8, are supported by means of pivot pins 10 which in turn engage bearings 11 of the gimbal. The vertical axis of transmitter 6 must be perpendicular to the plane of the field being measured. In the case of a compass, this means that the axis of rotation must coincide with the vertical. This is achieved by the provision of pendulous weight 12, formed of a heavy non-magnetic material, supported from core structure 7 by means of screws 13. Screws 14 are provided as clamping elements for pivot pins 10 to ensure permanence of adjustment. Wafer 15 is attached to pendulous element 12 by means of a screw 16 leaving a space between wafer 15 and the pendulous element. An aperture 17 is provided in the wafer for reasons which will become apparent. The entire foregoing structure is inserted within cup 18 so that the outer lip 20 of frame 1 rests within flange 21 of the cup. The cup may be filled with a suitable damping fluid preventing unnecessary oscillation of the transmitter structure.

The core structure 7 of the transmitter is illustrated in Figure 2 in an exploded view as comprising a supporting core 22 having a channel 24 surrounded by flanges 25. A similar channel is also provided on the opposite side of this member. Laminations 23 and 26, formed of a material having an inherently high magnetic permeability are seated within the channels of the core structure. The dimensions of the laminations and their channels are chosen for a close but not tight fit and the material of core 22 is selected to have a temperature coefficient of expansion as close as possible to that of laminations 23 and 26.

Covering the channels and laminations are fibrous elements 27 and 28 provided with apertures 30 and 31 respectively. The purpose of apertures 31 is to permit the screws 13 and 14 to pass through to the core 22, but apertures 30 are provided for adjustment purposes as described in the above-mentioned copending application.

Figure 3:
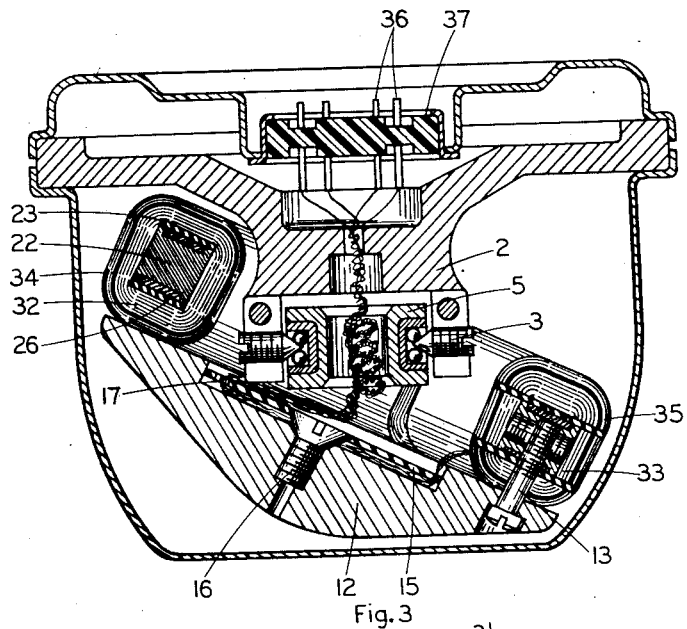
Figure 3 is a cross section view of the assembled magnetic field detector shown in Figure 1.

After assembly of the core structure, primary excitation windings 32 and 33 and secondary polyphase windings 34 and 35 may be positioned on the core structure as shown in Figure 3 in which the cross-sectional view is shown as intersecting the core and coil structure within a coil on the left and between coils on the right. The electrical leads from the windings are passed beneath wafer 15 through aperture 17 and gimbal 5 to hermetically sealed terminals 36 in ceramic plug 37.

Figure 4:
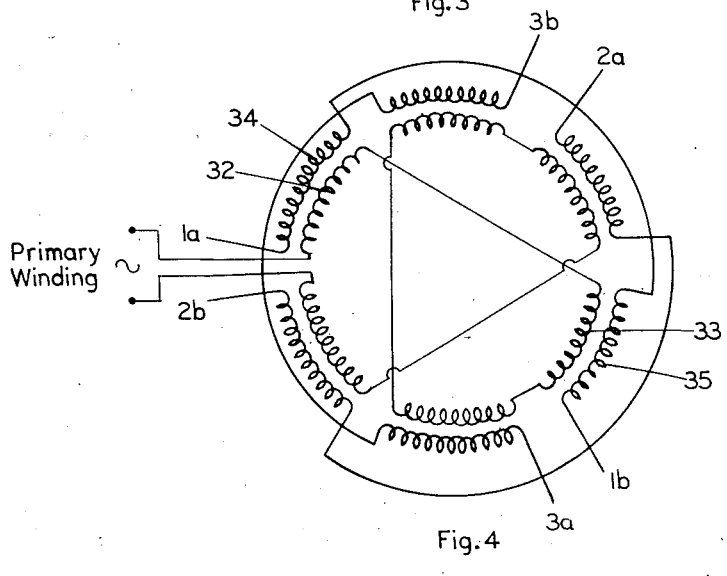
Figure 4 is a schematic diagram of a connection arrangement for the primary and secondary winding segments according to the principles of this invention.

The primary winding segments shown schematically in Figure 4 are connected in series so that the fields produced by the segments combine additively to produce a circumferential flux in the lamination structure. If an external magnetic field is applied to the transmitter, the periodic saturation of the lamination will force the external field to pulsate into and out of the core structure twice during each complete cycle of the excitation current. This pulsation will produce in each of the secondary winding segments a second harmonic signal resulting in a pattern of phase and amplitude differentiated potentials representative of the strength and direction of the external magnetic field. Since opposite pairs of the secondary winding are connected in series opposition, the fundamental frequency signal induced in one half of the pair will be equal to, but opposite in polarity from that of the other half of the pair. The fundamental frequency signal appearing in the output will therefore be to a large extent cancelled out. On the other hand, since the external magnetic field must traverse the core material in opposite directions on each side of the core, the signals resulting therefrom in each half of a pair of secondary segments will be additively combined. The secondary windings may be externally connected in wye or delta depending upon the polyphase system in which the magnetic detector is to be used.

In conventional telemetering systems, however, even with substantial cancellation of the fundamental frequency signal in the output, there will be spurious noise signals induced in the secondary winding by capacitive coupling with the primary winding. In order to reduce this capacitive interchange, there is provided a novel scheme of connection between segments of each winding. Referring to Figure 4, it may be seen that diametrically opposite segments of the primary winding are connected in immediate series relationship as are also the segments of the secondary winding. Figures 5 and 6 illustrate the manner in which the outer layer of one primary winding segment 32 is connected directly to the outer layer of the diametrically opposite primary winding segment 33, so that current entering entrance wire 38 will traverse the first segment 32 of the primary winding until it reaches the outer layer of the winding; it will then pass to the outer layer of winding 33 and leave the coil from the inner layer at exit wire 39. Such a scheme of winding places the outer layer of each of the two segments at substantially the same potential. Secondary winding segments 34 and 35 are wound directly over the primary segments in such a manner that a current path can be traced from wire 40 to the inner surface of segment 34, from thence to the inner surface of segment 35 and finally to wire 41 on the outer surface. The inner layers of these two secondary segments are, therefore, at the same potential.

With this connection arrangement, it can be seen that the capacitive coupling effect on one side of the telemetering unit is identical to that on the other side of the unit, since the coil segments on each side are physically similar and since the potential difference at any instant across interface 42 is the same as the potential difference across interface 43. Since, therefore, the capacitively coupled signal in each of the secondary segments is equal but opposite in direction to that in the other, this signal as well as the flux-induced fundamental signal will be cancelled out in the secondary polyphase circuit. It will be apparent that, in the same manner that spurious signals are thus prevented from entering the secondary winding, polyphase signals capacitively coupled into the primary winding from the secondary are cancelled out and prevented from being communicated detrimentally to other parts of the telemetering system. Circuit connections such as these result in a telemetering unit having an inherently high signal-to-noise ratio in the output. The dimensions of a compass transmitter constructed in accordance with the principles of this invention may, therefore, be very small in comparison with heretofore existing types, thereby permitting the installation of equipment of this nature in confined spaces such as are found in the thin wings of modern aircraft.

The teachings of this invention, though illustrated in connection with a particular magnetic field detector are equally applicable to other telemetering units including receivers as well as transmitters. For example, a second harmonic type receiver in all respects similar to the transmitter shown and described and having a pair of magnets pivotally suspended at the center of the toroid may be connected to receive in its secondary windings a second harmonic polyphase, position-characterized signal from a synchro transmitter. If, then, the primary winding is excited by a single-phase fundamental signal which periodically saturates the core structure, there will result a pulsating unidirectional field across the diameter of the receiver core. The magnets, which may be mechanically connected to perform various functions such as rotating a compass card, to mention only one, will then tend to align themselves with the pulsating field. A receiver of this type may be connected with a transmitter of the sort previously described to form a complete remote indicating compass system. It is to be understood that a telemetering unit constructed in accordance with my invention may also be used in conjunction with other known types of telemetering units and in other known telemetering systems.

Numerous constructions of telemetering units with various winding arrangements may be devised within the scope of these teachings. It is obvious, for example, that the positions of the primary and secondary winding segments might be reversed, although it is preferable to have the excitation winding in close proximity to the lamination structure. In addition, it is possible to divide the primary windings into two or more subsections connected electrically in parallel, and the potentials on the outermost layers of opposite winding segments may be adjusted to an equipotential level in the same way that two different points on a Wheatstone bridge are made equipotential. The series connection described, however, is preferable because a smaller current is required for a given level of excitation and because a more equal flux distribution is obtained in the core structure.

It should thus be apparent that the specific embodiments of this invention disclosed herein are of a descriptive rather than a limiting nature and that various changes, combinations, additions or substitutions may be made in accordance with these teachings without departing in spirit or in scope from the invention as set forth in the appended claims.

What I claim as new and desire to secure by Letters Patent of the United States is:

1. In combination with a telemetering unit utilizing the magnetic saturation characteristics of a core structure defining a closed flux path, the coil structure for said unit comprising: a polyphase winding comprising a plurality of phase sections, each of said phase sections being composed of at least one pair of multi-layer winding segments, the members of each pair being positioned on said core structure on diametrically opposite sides of said flux path and connected electrically in series opposition; an excitation winding comprising a plurality of multi-layer winding segments equal in number to the segments of said polyphase winding and connected electrically to induce a changing circumferential flux in said flux path when said excitation winding is energized with an alternating current signal; the segments of one of said windings being positioned on the segments of the other of said windings and concentric therewith, electrical connections between segments of each of said windings being such that the outermost layers of the innermost diametrically opposite pairs are substantially equipotential and such that the innermost layers of the outermost diametrically opposite pairs are substantially equipotential, whereby signals capacitively transferred between primary and secondary windings are cancelled.

2. In combination with a telemetering unit utilizing the magnetic saturation characteristics of a core structure defining a closed flux path, the coil structure for said unit comprising: a first series of paired multi-layer winding segments positioned on said core structure equally spaced about the flux path therein, connections between the segments of said first series being such that the outermost layers of diametrically opposite pairs are substantially equipotential; a second series of paired multi-layer winding segments positioned on said first series and concentric therewith, connections between the segments of said second series being such that the innermost layers of diametrically opposite pairs are substantially equipotential; the segments of one of said series being connected together to product a circumferential flux in said flux path when electrically energized, diametrically opposite pairs of the other of said series being connected electrically in series opposition.

3. A telemetering unit comprising: a magnetically saturable core structure defining a closed flux path; a first series of paired multi-layer winding segments in equally spaced positions about said core structure, the outermost layers of diametrically opposite pairs being connected together equipotentially; a second series of paired multi-layer winding segments, the segments of which are wound around the segments of said first series, the innermost layers of diametrically opposite pairs being connected together equipotentially; the direction of winding of one of said series of segments being such that diametrically opposite pairs are electrically in series aiding relationship whereby an alternating current therein sets up changing circumferential flux in said core structure, the direction of winding of the other of said series of segments being such that diametrically opposite pairs are electrically in series opposition.

4. An electromagnetic telemetering unit comprising: a magnetically saturable core structure defining a closed flux path, a primary excitation winding having an even number of multilayer winding segments arranged about said core structure to induce circumferential fluxes therein, diametrically opposite pairs of primary segments being electrically connected in immediate series aiding relationship; a secondary polyphase winding comprising an even number of multi-layer winding segments arranged about said members concentric with said excitation winding segments, diametrically opposite pairs of secondary segments being electrically connected in immediate series opposition; connection between opposite pairs of winding segments being such that the outermost layers of the innermost pair of diametrically opposite winding segments are equipotential and such that the innermost layers of the outermost diametrically opposite winding segments are equipotential; whereby signals transferred capacitively between said primary and secondary winding segments are effectively cancelled.

5. In combination with a toroidal type telemetering unit having a circular, saturable core structure, the coil structure for said unit comprising a primary excitation winding and a secondary polyphase winding, each of said windings being divided into an even number of multi-layer segments, the segments of one winding being wound upon the segments of the other winding, diametrically opposite pairs of said secondary winding being connected in series opposition, connections between primary and secondary winding segments being such that the outermost layers of the innermost diametrically opposite pairs of winding segments are equipotential, and such that the innermost layers of the outermost diametrically opposite pairs of winding segments are equipotential, whereby signals capacitively transferred between primary and secondary windings are cancelled out.

6. In combination with a toroidal type telemetering unit having a circular, saturable core structure, the coil structure for said unit comprising a primary excitation winding having six multi-layer coil segments equally spaced about said core structure, diametrically opposite pairs of segments being connected with the outermost layer of each at substantially the same electrical potential, a secondary polyphase winding composed of six multi-layer coil segments wound over said primary segments, diametrically opposite pairs of secondary segments being connected in series opposition with the innermost layer of each at substantially the same electrical potential.

No references cited.